United States Patent
Uechi

(10) Patent No.: US 10,124,776 B2
(45) Date of Patent: Nov. 13, 2018

(54) BRAKE CONTROL DEVICE FOR VEHICLE

(71) Applicant: TOYOTA JIDOSHA KABUSHIKI KAISHA, Toyota-shi, Aichi-ken (JP)

(72) Inventor: Masaaki Uechi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 121 days.

(21) Appl. No.: 15/278,919

(22) Filed: Sep. 28, 2016

(65) Prior Publication Data

US 2017/0106839 A1  Apr. 20, 2017

(30) Foreign Application Priority Data

Oct. 16, 2015 (JP) .................. 2015-204654

(51) Int. Cl.
*B60T 7/22* (2006.01)
*B60T 7/04* (2006.01)
*B60T 8/24* (2006.01)
*B60T 8/72* (2006.01)

(52) U.S. Cl.
CPC ................ *B60T 7/22* (2013.01); *B60T 7/042* (2013.01); *B60T 8/246* (2013.01); *B60T 8/72* (2013.01); *B60T 2201/022* (2013.01); *B60W 2540/10* (2013.01); *B60W 2540/12* (2013.01)

(58) Field of Classification Search
CPC ... B60T 7/22; B60T 7/042; B60T 8/72; B60T 8/246; B60T 2201/022; B60W 2540/10; B60W 2540/12
See application file for complete search history.

(56) References Cited

U.S. PATENT DOCUMENTS

| 6,234,589 B1 | 5/2001 | Yoshida | |
|---|---|---|---|
| 2005/0143877 A1* | 6/2005 | Cikanek | B60K 6/46 701/22 |
| 2013/0151110 A1 | 6/2013 | Hashimoto et al. | |
| 2015/0046054 A1 | 2/2015 | Takahashi et al. | |

FOREIGN PATENT DOCUMENTS

| JP | 2005-082041 A | 3/2005 |
|---|---|---|
| JP | 3927256 B2 | 6/2007 |
| JP | 2008-305421 A | 12/2008 |
| JP | 2010-282350 A | 12/2010 |

(Continued)

*Primary Examiner* — Alan D Hutchinson
(74) *Attorney, Agent, or Firm* — Oliff PLC

(57) ABSTRACT

A brake control device includes: an object detector; and an ECU configured to (a) determine, based on an output of the object detector, whether a predetermined condition that there is a possibility that the vehicle collides with the object, is satisfied; (b) apply an automatic brake when it is determined that the predetermined condition is satisfied; and (c) stop applying the automatic brake when an operation amount of an accelerator operation unit of the vehicle becomes equal to or larger than a predetermined threshold. The ECU also continues applying the automatic brake when a specified condition including a condition that an operation amount of a brake operation unit of the vehicle is larger than a predetermined amount is satisfied even when it has been determined that the operation amount of the accelerator operation unit becomes equal to or larger than the predetermined threshold.

7 Claims, 11 Drawing Sheets

(56) References Cited

FOREIGN PATENT DOCUMENTS

| | | |
|---|---|---|
| JP | 1701985 B2 | 6/2011 |
| JP | 2012-097634 A | 5/2012 |
| JP | 2012-111263 A | 6/2012 |
| JP | 2012-229722 A | 11/2012 |
| JP | 2013-122180 A | 6/2013 |
| JP | 2014-004905 A | 1/2014 |
| JP | 2014-093040 A | 5/2014 |
| JP | 2015-036270 A | 2/2015 |

* cited by examiner

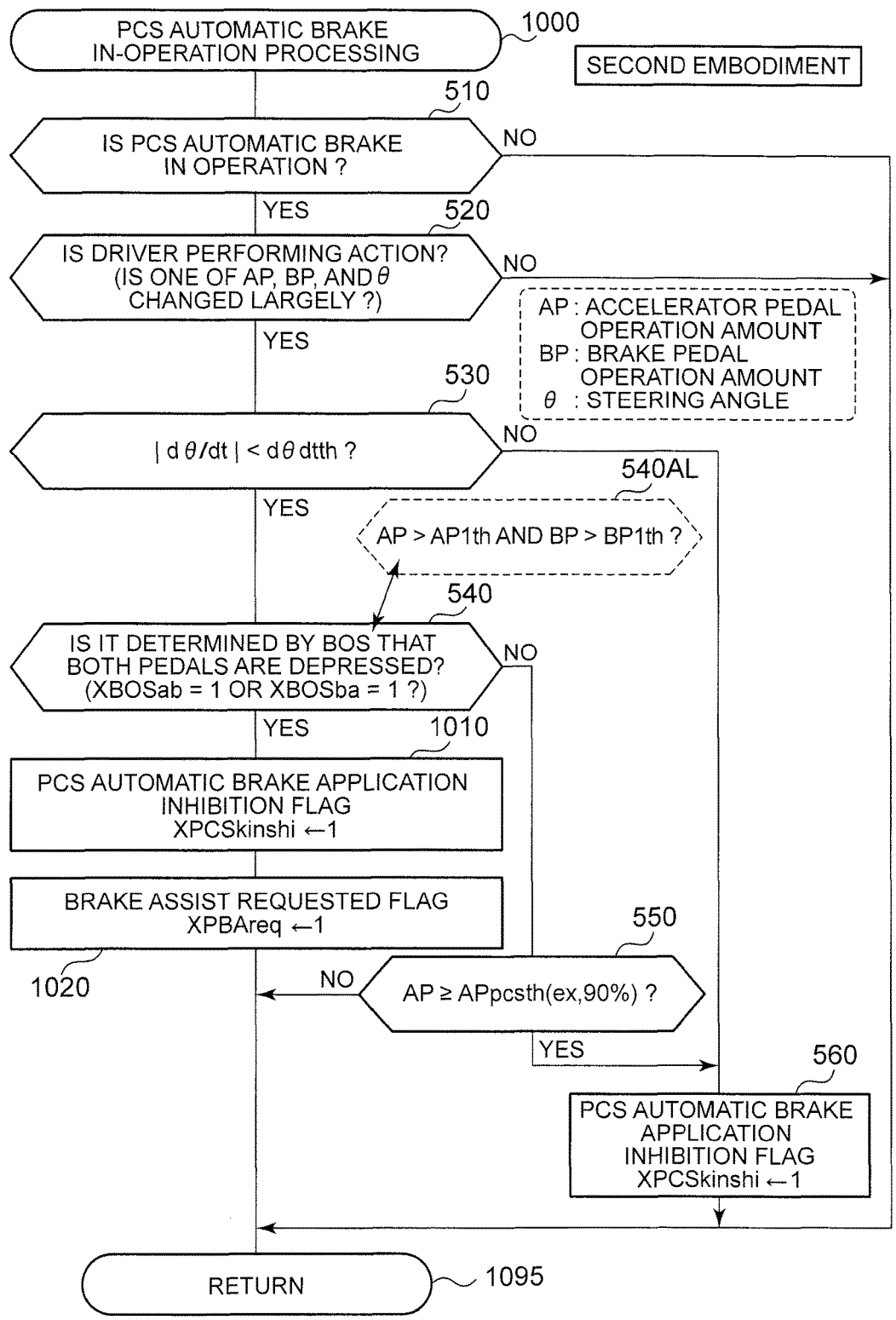

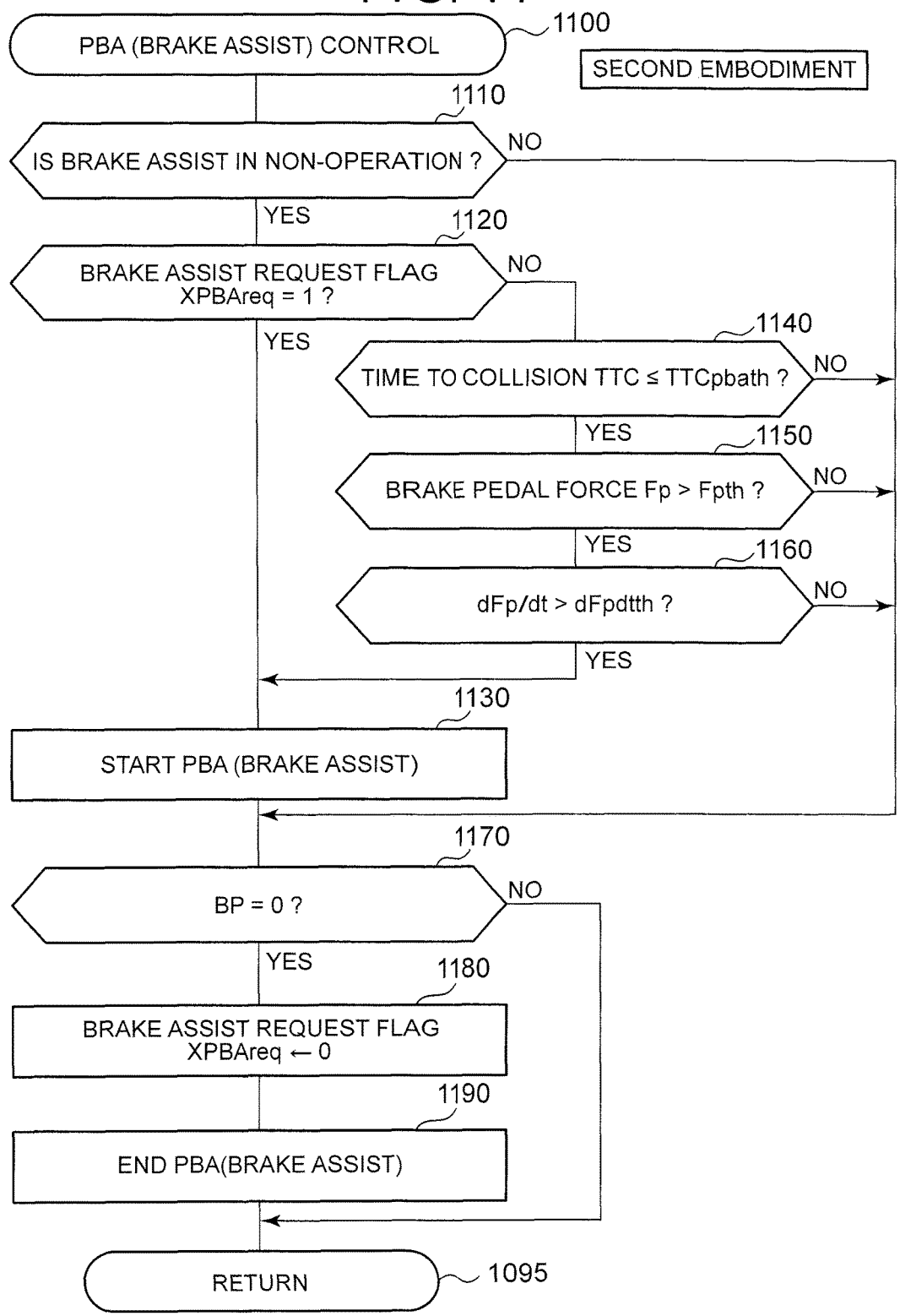

BRAKE CONTROL DEVICE FOR VEHICLE

INCORPORATION BY REFERENCE

The disclosure of Japanese Patent Application No. 2015-204654 filed on Oct. 16, 2015 including the specification, drawings and abstract is incorporated herein by reference in its entirety.

BACKGROUND

1. Technical Field

The present disclosure relates to a brake control device for a vehicle that automatically applies a braking force to the vehicle when it is determined that there is a possibility that the vehicle will collide with an object (obstacle) in front of the vehicle.

2. Description of Related Art

A brake control device is known that detects an object (obstacle) in front of a vehicle and, when it is determined that there is a possibility that the vehicle will collide with the detected object, automatically applies a braking force to the vehicle. One of the brake control devices according to a related art, which automatically applies such an automatic brake, checks the accelerator pedal operation amount (accelerator position) of a vehicle and, when the accelerator pedal operation amount becomes equal to or larger than a predetermined value while the automatic brake is applied, determines that the driver has an intention to release the automatic braking and releases (stops) the automatic braking (for example, see Japanese Patent Application Publication No. 2005-82041 (JP 2005-82041 A) and Japanese Patent Application Publication No. 2015-36270 (JP 2015-36270 A)).

By the way, the system (Brake Override System: BOS) has been employed on a vehicle that, when both the accelerator pedal working as an accelerator operation unit of the vehicle and the brake pedal working as a brake operation unit of the vehicle are operated at the same time, reduces the driving force of the vehicle with priority on the braking force of the vehicle.

If mounted on a vehicle that employs such a BOS, the brake control device described above releases the automatic braking when the accelerator pedal operation amount becomes equal to or larger than the predetermined value during the automatic braking even if the brake pedal is operated at that time. However, "the state in which both the accelerator pedal and the brake pedal are operated at the same time" does not necessarily means that the driver has an intention to release the automatic braking even when the accelerator pedal operation amount becomes equal to or larger than the predetermined value. In addition, the automatic braking is applied when a relatively large force is required to apply the brake to the vehicle. Therefore, if the automatic braking is simply released, a preferable vehicle traveling assistance may not be provided.

SUMMARY

The embodiments provide a brake control device for a vehicle that performs appropriate brake control when both the accelerator operation unit and the brake operation unit are operated at the same time during automatic braking that is applied when there is a possibility that the vehicle will collide with an object.

A first aspect of the brake control device includes: an object detector that detects an object in front of a vehicle; and at least one ECU (Electronic Control Unit). The ECU is configured to: (a) determine whether a predetermined condition is satisfied based on an output of the object detector, the predetermined condition indicating that there is a possibility that the vehicle collides with the object, (b) apply an automatic brake when it is determined that the predetermined condition is satisfied, the automatic brake automatically applying a braking force to the vehicle, (c) stop applying the automatic brake when an operation amount of an accelerator operation unit of the vehicle becomes equal to or larger than a predetermined threshold while the automatic brake is being applied, (d) determine whether a specified condition is satisfied, the specified condition including a condition that an operation amount of a brake operation unit of the vehicle is larger than a second predetermined amount, and (e) continue applying the automatic brake regardless of whether the operation amount of the accelerator operation unit becomes equal to or larger than the predetermined threshold, when it is determined that the specified condition is satisfied.

According to the first aspect, the specified condition is used to determine whether "the state in which both the accelerator pedal working as an accelerator operation unit and the brake pedal working as a brake operation unit are operated at the same time" described above is generated.

The at least one ECU is configured to not stop, but continue, applying the automatic brake when it is determined that the specified condition is satisfied while the automatic brake is being applied.

In other words, even if the operation amount of the accelerator operation unit becomes equal to or larger than the predetermined automatic brake stop threshold while the automatic brake is being applied, the at least one ECU does not stop, but continues, applying the automatic brake.

Therefore, because applying the automatic brake is continued when "the state in which both the accelerator pedal and the brake pedal are operated at the same time" is generated, the braking force for avoiding collision with an object can be continuously applied to the vehicle. On the other hand, if the brake pedal is not depressed but the accelerator pedal is depressed strongly, it is determined that the driver has "an intention to release the automatic brake" and therefore applying the automatic brake can be released.

A second aspect of the brake control device includes: an object detector that detects an object in front of a vehicle; and at least one ECU. The ECU is configured to (a) determine whether a predetermined condition is satisfied based on an output of the object detector, the predetermined condition indicating that there is a possibility that the vehicle collides with the object, (b) apply an automatic brake when it is determined that the predetermined condition is satisfied, the automatic brake automatically applying a braking force to the vehicle, (c) determine whether a specified condition is satisfied, the specified condition including a condition that an operation amount of a brake operation unit of the vehicle is larger than a second predetermined amount, (d) stop applying the automatic brake when an operation amount of an accelerator operation unit becomes equal to or larger than a predetermined automatic brake stop threshold while the automatic brake is being applied and stop applying the automatic brake when it is determined that the specified condition is satisfied while the automatic brake is being applied, and (e) perform brake assist control for the vehicle when it is determined that the specified condition is satisfied while the automatic brake is being applied, the brake assist control increasing a braking force that is generated according to the operation amount of the brake operation unit as compared to a braking force that is generated when the brake assist control is not performed.

According to the second aspect described above, when the accelerator pedal is depressed while the brake pedal is not depressed, it is determined that the driver has "an intention to release the automatic brake" and therefore applying the automatic brake can be released.

In addition, because the accelerator pedal is operated in the state in which both the accelerator pedal and the brake pedal are operated at the same time, there is a possibility that the driver has "an intention to release the automatic brake". Therefore, in this case too, the at least one ECU described above releases applying the automatic brake.

However, because the brake pedal is also operated in the state in which both the accelerator pedal and the brake pedal are operated at the same time, there is a possibility that the driver is going to apply the brake to the vehicle.

Therefore, in the second aspect, brake assist control is provided that, if it is determined that the specified condition is satisfied while the automatic brake is being applied, performs brake assist control, which assists in the operation of the brake operation unit performed by the driver of the vehicle, for increasing the braking force that is generated according to the operation amount of the brake operation unit as compared to the braking force that is generated when the brake assist control is not performed.

According to this aspect, if the driver has an intention to release the automatic brake in the state in which both the accelerator pedal and the brake pedal are depressed at the same time, applying the automatic brake is released according to the driver's intention. On the other hand, if the driver has an intention to apply the brake to the vehicle, the brake assist control allows the driver to apply a large braking force to the vehicle by a small amount of brake operation.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 10 is a flowchart showing a routine executed by the CPU of the driving assistance ECU included in a brake control device (second device) in a second embodiment; and FIG. 11 is a flowchart showing a routine executed by the CPU of the driving assistance ECU included in the second device.

DETAILED DESCRIPTION OF EMBODIMENTS

A brake control device according to various embodiments is described in detail below with reference to the drawings.

First Embodiment

Figure 1:
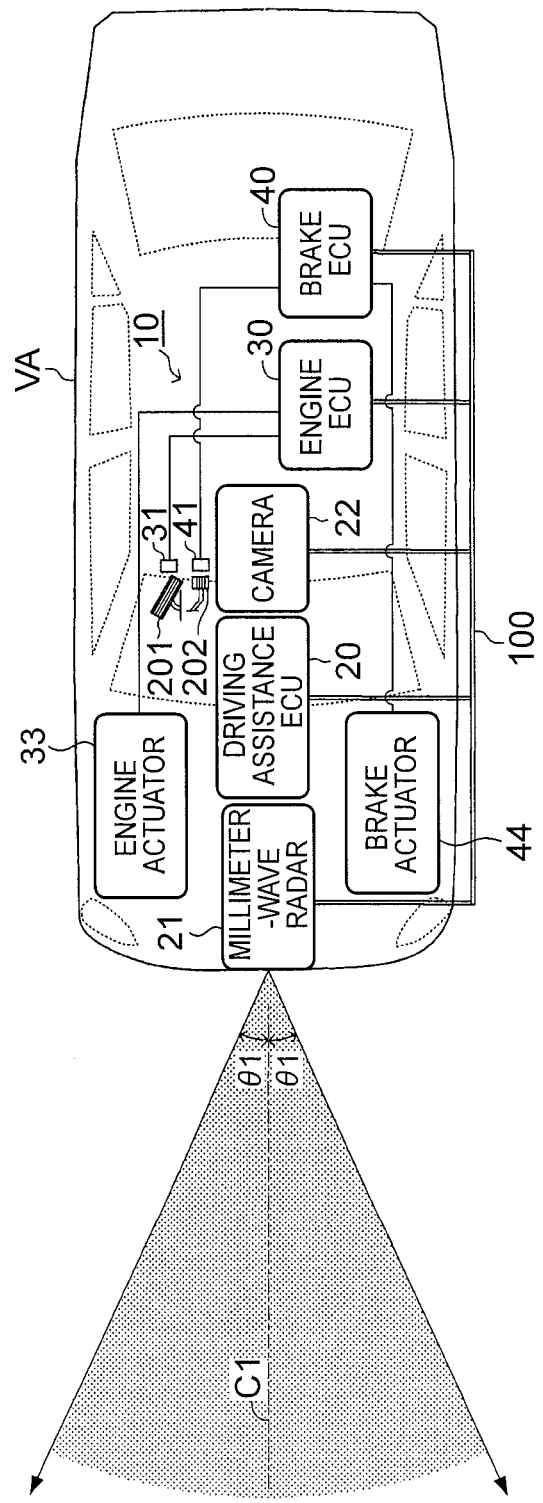
FIG. 1 is a diagram showing the outline configuration of a brake control device in a first embodiment.

As shown in FIG. 1, a brake control device (hereinafter sometimes called a "first device") 10 in a first embodiment is mounted on a vehicle VA. The first device 10 includes a driving assistance ECU 20, an engine ECU 30, a brake ECU 40, and other ECUs (see FIG. 2). These ECUs can exchange data with each other (can communicate with each other) via a communication/sensor system Controller Area Network (CAN) 100. An ECU, an abbreviation for an Electronic Control Unit, is an electronic control circuit that includes a microcomputer, which includes a CPU, a ROM, a RAM, an interface, and so on, as its major components. The CPU executes the instructions (routine), stored in the memory (ROM), to implement the various functions that will be described later. There ECUs may be integrated into one ECU.

In addition, the first device 10 includes a millimeter-wave radar device 21 and a camera device 22. The millimeter-wave radar device 21 and the camera device 22 also can exchange data with the driving assistance ECU 20 via the CAN 100.

Figure 2:
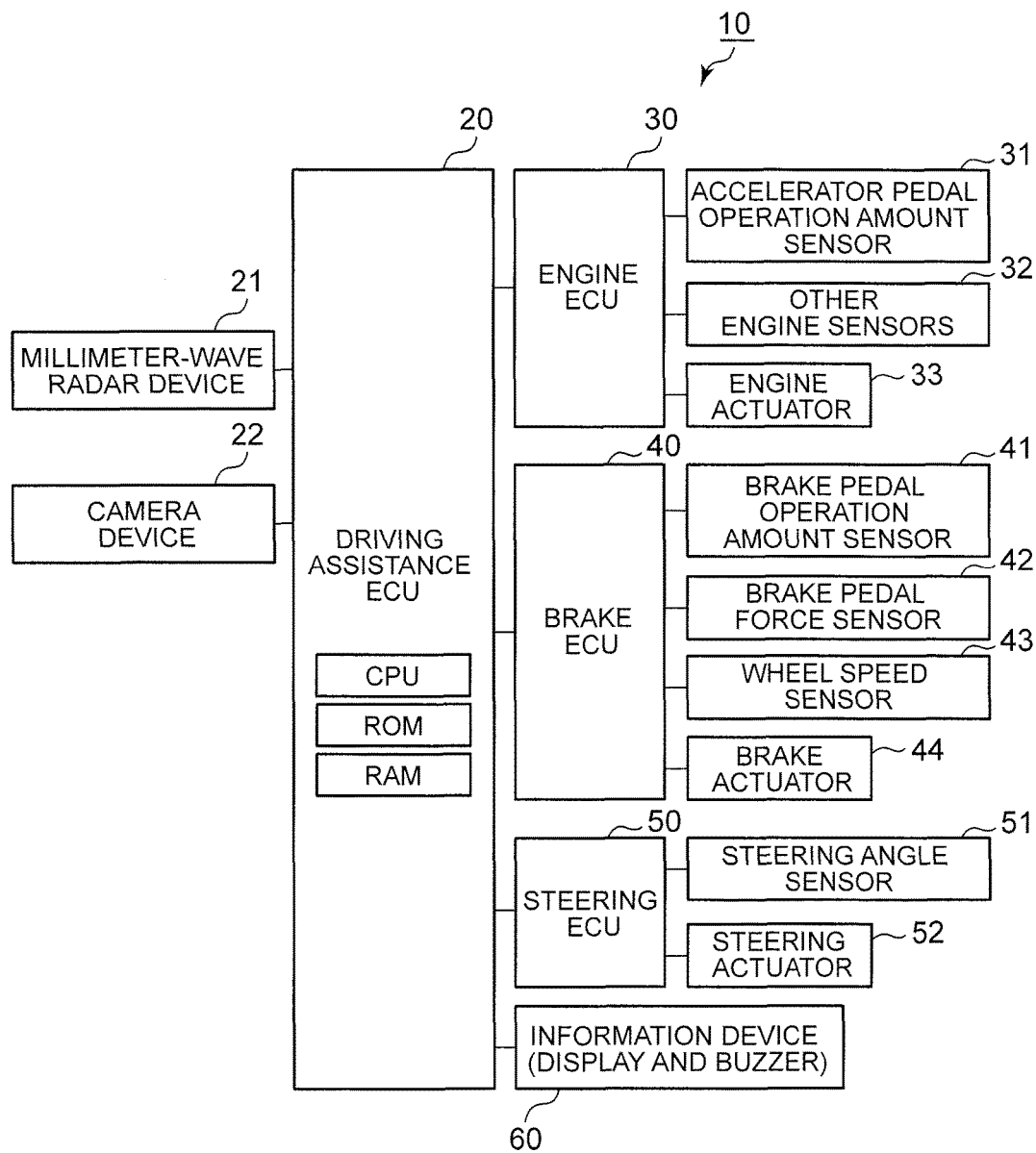
FIG. 2 is a diagram showing the detailed configuration of the brake control device shown in FIG. 1.

In more detail, the driving assistance ECU 20 is connected to the millimeter-wave radar device 21 and the camera device 22 as shown in FIG. 2 so that the driving assistance ECU 20 can communicate with those devices.

The millimeter-wave radar device 21 includes a millimeter wave sending/receiving unit and a processing unit. As shown in FIG. 1, the millimeter-wave radar device 21 is provided on the front edge of the vehicle VA and in the center of the vehicle-width direction. The millimeter wave sending/receiving unit sends a millimeter wave that has the central axis C1 extending in the straight-ahead direction of the vehicle VA and that propagates at a predetermined angle of θ1 on the left and right sides of the central axis C1. The millimeter wave is reflected by an object (for example, a preceding vehicle). The millimeter wave sending/receiving unit receives this reflected wave.

The processing unit of the millimeter-wave radar device 21 acquires object information, such as the distance to an object (obstacle), the relative speed of the object (the speed of the object in relation to the speed of the host vehicle), and the direction of the object (the angle between the straight line, which passes through the position where the object is present and the position where the millimeter-wave radar device 21 is provided, and the central axis C1), based on the phase difference between the transmitted millimeter wave and the received reflected wave, the attenuation level of the reflected wave, and the time from the moment the millimeter wave is sent to the moment the reflected wave is received.

The camera device 22 is provided at the top, and on the interior side, of the windshield as shown in FIG. 1. The camera device 22 acquires the image in the straight-ahead direction of the vehicle VA and acquires the object information (the distance to an object, the relative speed of the object, and the direction of the object, etc.) from the image. The driving assistance ECU 20 modifies the object information, acquired by the millimeter-wave radar device 21, based on the object information acquired by the camera device 22 to acquire the final object information to be used for collision determination that will be described later.

As shown in FIG. 2, the engine ECU 30, connected to an accelerator pedal operation amount sensor (accelerator position sensor) 31 and other multiple engine sensors 32, receives detection signals from those sensors.

The accelerator pedal operation amount sensor 31 detects the operation amount AP of an accelerator pedal 201 of the vehicle VA shown in FIG. 1. The accelerator pedal operation amount AP is "0" when the accelerator pedal 201 is not operated. The other multiple engine sensors 32 detect the driving state amounts of the "gasoline-fuel-injection/spark-ignition internal combustion engine that is the driving source of the vehicle VA" not shown. The engine sensors 32 include a throttle valve-opening sensor, an engine rotation speed sensor, an intake air volume sensor, and so on.

In addition, the engine ECU 30 is connected to an engine actuator 33 such as the throttle valve actuator and the fuel injection valve. The engine ECU 30 drives the engine actuator 33 to change the torque generated by the internal combustion engine and thereby to adjust the driving force of the vehicle VA. The engine ECU 30 drives the throttle valve actuator so that the throttle valve opening matches the pre-set target throttle valve opening TAtgt. The engine ECU 30 determines the target throttle valve opening TAtgt so that the larger the accelerator pedal operation amount AP is during normal driving, the larger the target throttle valve opening TAtgt is.

The brake ECU 40, connected to a brake pedal operation amount sensor 41, a brake pedal force sensor 42, and multiple wheel speed sensors 43, receives the detection signals from these sensors.

The brake pedal operation amount sensor 41 detects the operation amount (pedal depression amount) BP of a brake pedal 202 of the vehicle VA shown in FIG. 1. The brake pedal operation amount BP is "0" when the brake pedal is not operated. The brake pedal operation amount sensor 41 may include a stop lamp switch that changes from the off state to the on state when the driver starts depressing the brake pedal 202. In this case, the brake pedal operation amount BP is "0" when the stop lamp switch is off, and is a value larger than "0" when the stop lamp switch is on.

The brake pedal force sensor 42 detects the pedal force Fp of the brake pedal 202. Each of the multiple wheel speed sensors 43 outputs the pulse signal corresponding to the rotation speed (wheel rotation speed) of the respective wheel. Based on this pulse signal, the brake ECU 40 detects the rotation speed of each wheel. In addition, the brake ECU 40 is configured to acquire the vehicle speed (host vehicle speed) SPD of the vehicle VA based on the rotation speed of the wheels. The brake ECU 40 may be connected to the vehicle speed sensor that detects the rotation speed of the driving axis as the vehicle speed SPD.

In addition, the brake ECU 40 is connected to a brake actuator 44. The brake actuator 44 is a hydraulically controlled actuator. The brake actuator 44 is provided in the hydraulic circuit between the master cylinder, which presses the hydraulic oil by the brake pedal force, and the friction brake device that includes a known wheel cylinder provided on each wheel (all not shown). The brake actuator 44 adjusts the oil pressure to be supplied to the wheel cylinder.

On the other hand, the brake ECU 40 drives the brake actuator 44 based on the pre-set final target deceleration to control the oil pressure of the hydraulic oil to be supplied to the wheel cylinder. As a result, the adjusted braking force (frictional braking force) is generated on each wheel with the result that the deceleration of the vehicle VA is made to match the target deceleration. In this specification, the deceleration refers to the magnitude of negative acceleration. That is, the larger the negative acceleration is, the larger the deceleration is. As will be described later, the brake ECU 40 receives a plurality of requested decelerations, calculated by the brake ECU 40 itself and the driving assistance ECU 20, and selects the largest of those requested decelerations as the final target deceleration.

As shown in FIG. 2, the driving assistance ECU 20 is connected also to a steering ECU 50 and an information device 60.

The steering ECU 50 is connected to a steering angle sensor 51 and a steering actuator 52. The steering angle sensor 51 detects the steering angle θ that is the turning angle of the steering wheel. The steering actuator 52 is the motor of the electric power steering device not shown.

The information device 60 includes a display device and a sounding device installed in the driver's visible range. The information device 60 displays information and generates sound in response to an instruction from the driving assistance ECU 20.

The first device automatically applies a braking force to the vehicle VA when it is determined that there is a possibility that the vehicle VA will collide with an object (for example, an obstacle such as other vehicles) in front of the vehicle VA. Such automatic braking (hereinafter sometimes called "pre-crash safety brake" or "PCS automatic brake") is described, for example, in Japanese Patent Application Publication No. 2012-229722 (JP 2012-229722 A), Japanese Patent Application Publication No. 2005-82041 (JP 2005-82041 A), and Japanese Patent Application Publication No. 2015-36270 (JP 2015-36270 A).

If the accelerator pedal operation amount AP becomes equal to or larger than a predetermined automatic brake stop threshold (APpcsth) while the PCS automatic brake is applied, the first device stops (releases) the PCS automatic brake. However, if "the state in which both the accelerator pedal 201 working as an accelerator operation unit and the brake pedal 202 working as a brake operation unit are operated at the same time" is detected while the PCS automatic brake is applied, the first device does not stop, but continues, the PCS automatic brake even if the accelerator pedal operation amount AP becomes equal to or larger than the automatic brake stop threshold (APpcsth).

Therefore, because the automatic brake is continued if "the state in which both the accelerator pedal 201 and the brake pedal 202 are operated at the same time" occurs, the braking force to avoid collision with an object can be applied continuously to the vehicle. On the other hand, if the brake pedal 202 is not depressed and the accelerator pedal 201 is depressed strongly (AP>APpcsth), it can be determined that the driver has "an intention to release the automatic brake". Therefore, in that case, the first device releases the automatic braking.

Next, the specific operation of the first device is described below. First, the operation performed when the operation of the PCS automatic brake is started is described. The CPU of the driving assistance ECU 20 (hereinafter, the notation "CPU" refers to the CPU of the driving assistance ECU 20 unless otherwise specified) executes the routine (PCS automatic brake operation start routine), shown by the flowchart in FIG. 3, each time a predetermined time elapses.

Therefore, at a predetermined time, the CPU starts the processing in step 300 in FIG. 3 and proceeds to step 310 to determine whether the value of the PCS automatic brake application inhibition flag (hereinafter, sometimes called "inhibition flag") XPCSkinshi is "0". The value of the inhibition flag XPCSkinshi is set to "0" by the initial routine executed by the CPU when the ignition key switch of the vehicle VA, not shown, is changed from the OFF position to the ON position. As will be described later, when the value of the inhibition flag XPCSkinshi is "1", the PCS automatic brake is inhibited (not applied).

If the value of the inhibition flag XPCSkinshi is "0", the CPU determines that the result of step 310 is "Yes" and then proceeds to step 320 to determine whether the PCS automatic brake is currently in non-operation (stopped).

If the PCS automatic brake is currently in non-operation, the CPU determines that the result of step 320 is "Yes" and then proceeds to step 330 to determine whether there is a possibility that the vehicle VA will collide with an object (for example, an obstacle such as other vehicles). That is, in step 330, the CPU determines whether a predetermined condition, which indicates that there is a possibility of collision with the detected object, is satisfied.

More specifically, the CPU calculates the time to collision (TTC: Time to Collision, hereinafter sometimes called a "time to collision TTC"), based on the final object information described above (or object information acquired by the millimeter-wave radar device 21). That is, the CPU substitutes the "distance D to the object and the relative speed V of the object", which is the object information, in expression (1) given below to calculate the time to collision TTC. The CPU may also calculate the time to collision TTC, considering the current acceleration of the vehicle VA and/or the differential value of the relative speed (relative acceleration).

$$TTC=D/V \quad (1)$$

After that, the CPU determines whether the time to collision TTC is equal to or smaller than the threshold time TTCth for automatic braking. If the time to collision TTC is equal to or smaller than the threshold time TTCth, the CPU determines that there is a possibility that the vehicle VA will collide with the object (that the predetermined condition is satisfied and there is a possibility of collision). To determine this collision possibility, the technologies disclosed in Japanese Patent Application Publication No. 2010-282350 (JP 2010-282350 A), Japanese Patent Application Publication No. 2012-229722 (JP 2012-229722 A), and Japanese Patent Application Publication No. 2014-93040 (JP 2014-93040 A) may be applied.

If it is determined in step 330 that there is a possibility of collision, the CPU proceeds to step 340 to determine whether the absolute value ($|d\theta/dt|$) of the amount of change in the steering angle $\theta$ per unit time (time differential value of steering angle $d\theta/dt$) is smaller than the collision avoidance threshold $d\theta tth$ that is a positive value. That is, in step 340, the CPU determines whether the driver performs the collision avoidance operation via the steering operation.

If the absolute value ($|d\theta/dt\theta|$) of the amount of change in the steering angle $\theta$ per unit time is smaller than the threshold $d\theta tth$, the CPU determines that the result of step 340 is "Yes" and proceeds to step 350 to determine whether the BOS has determined that "both the accelerator pedal 201 and the brake pedal 202 are depressed". More specifically, in step 350, the CPU determines whether the value of at least one of the both-pedal depression determination flag XBOSab and the both-pedal depression determination flag XBOSba is set to "1". The detail of this determination by the BOS (both-pedal depression determination) will be described later. Note that both the both-pedal depression determination flag XBOSab and the both-pedal depression determination flag XBOSba are set to "1" if the specified condition (for example, the precondition has been satisfied for the threshold time or longer) is satisfied. The specified condition includes the condition (precondition) that the accelerator pedal operation amount AP is larger than the first predetermined amount and the brake pedal operation amount BP is larger than the second predetermined amount.

If it is determined that both the accelerator pedal 201 and the brake pedal 202 are depressed (that is, if the value of at least one of the both-pedal depression determination flag XBOSab and the both-pedal depression determination flag XBOSba is set to "1"), the CPU determines that the result of step 350 is "Yes" and proceeds to step 360 to start the operation of the PCS automatic brake. That is, the CPU sets the magnitude of the requested deceleration Gpcs, which is based on the PCS automatic brake, to a predetermined value (variable value) that is larger than "0" and sends this requested deceleration Gpcs to the brake ECU 40. After that, the CPU proceeds to step 395 to once terminate this routine.

On the other hand, the brake ECU 40 executes a routine, not shown, to calculate the brake operation requested deceleration Gbpd based on the brake pedal operation amount BP. The brake operation requested deceleration Gbpd is calculated as a larger value as the brake pedal operation amount BP is larger. In addition, the brake ECU 40 employs the larger of the brake operation requested deceleration Gbpd and the requested deceleration Gpcs, which is based on the PCS automatic brake, as the target deceleration and controls the brake actuator 44 so that the deceleration equal to the target deceleration is generated in the vehicle VA. As a result, even if the brake pedal 202 is not operated, a braking force is applied automatically to the vehicle VA. That is, the PCS automatic brake is applied.

On the other hand, if it is not determined that both the accelerator pedal 201 and the brake pedal 202 are depressed when the CPU performs the processing in step 350 (that is, if both the flag XBOSab and the flag XBOSba are "0"), the CPU determines that the result of step 350 is "No" and proceeds to step 370. Then, in step 370, the CPU determines whether the accelerator pedal operation amount AP is equal to or larger than the PCS automatic brake stop threshold APpcsth. For example, this threshold APpcsth is a value corresponding to 90% of the maximum value of the accelerator pedal operation amount AP that is 100%. This threshold APpcsth may be a value larger than "0".

If it is not determined that both the accelerator pedal 201 and the brake pedal 202 are depressed and if the accelerator pedal operation amount AP is equal to or larger than the PCS automatic brake stop threshold APpcsth, it can be estimated that the driver has an intention to avoid collision via the accelerator pedal operation. Therefore, in this case, the CPU determines that the result of step 370 is "Yes" and proceeds to step 380 to set the value of the inhibition flag XPCSkinshi to "1". After that, the CPU proceeds to step 395. As a result, if it is determined in step 330 that there is a possibility of collision but if only the accelerator pedal 201 is depressed strongly, the operation of the PCS automatic brake is not started.

On the other hand, if the accelerator pedal operation amount AP is smaller than the PCS automatic brake stop threshold APpcsth, the CPU determines that the result of step 370 is "No" and proceeds to step 360. As a result, the operation of the PCS automatic brake is started.

In addition, if the absolute value ($|d\theta/dt|$) of the amount of change in the steering angle $\theta$ per unit time when the CPU performs the processing in step 340 is equal to or larger than the threshold $d\theta tth$, it can be estimated that the driver has an intention to avoid collision via the steering operation. Therefore, in this case, the CPU determines that the result of step 340 is "No" and proceeds to step 380 and, after that, proceeds to step 395 to once terminate this routine. As a result, even if it is determined in step 330 that there is a possibility of collision, the operation of the PCS automatic brake is not started.

In addition, if the CPU determines the result of step 310 is "No", that the result of step 320 is "No", and that result of step 330 is "No", the CPU proceeds from the respective step directly to step 395 to once terminate this routine. Therefore, in those cases, too, the operation of the PCS automatic brake is not started.

Next, the end (stop) of the PCS automatic brake is described. The CPU executes the routine (PCS automatic brake operation end routine), shown by the flowchart in FIG. 4, each time a predetermined time elapses.

Figure 4:
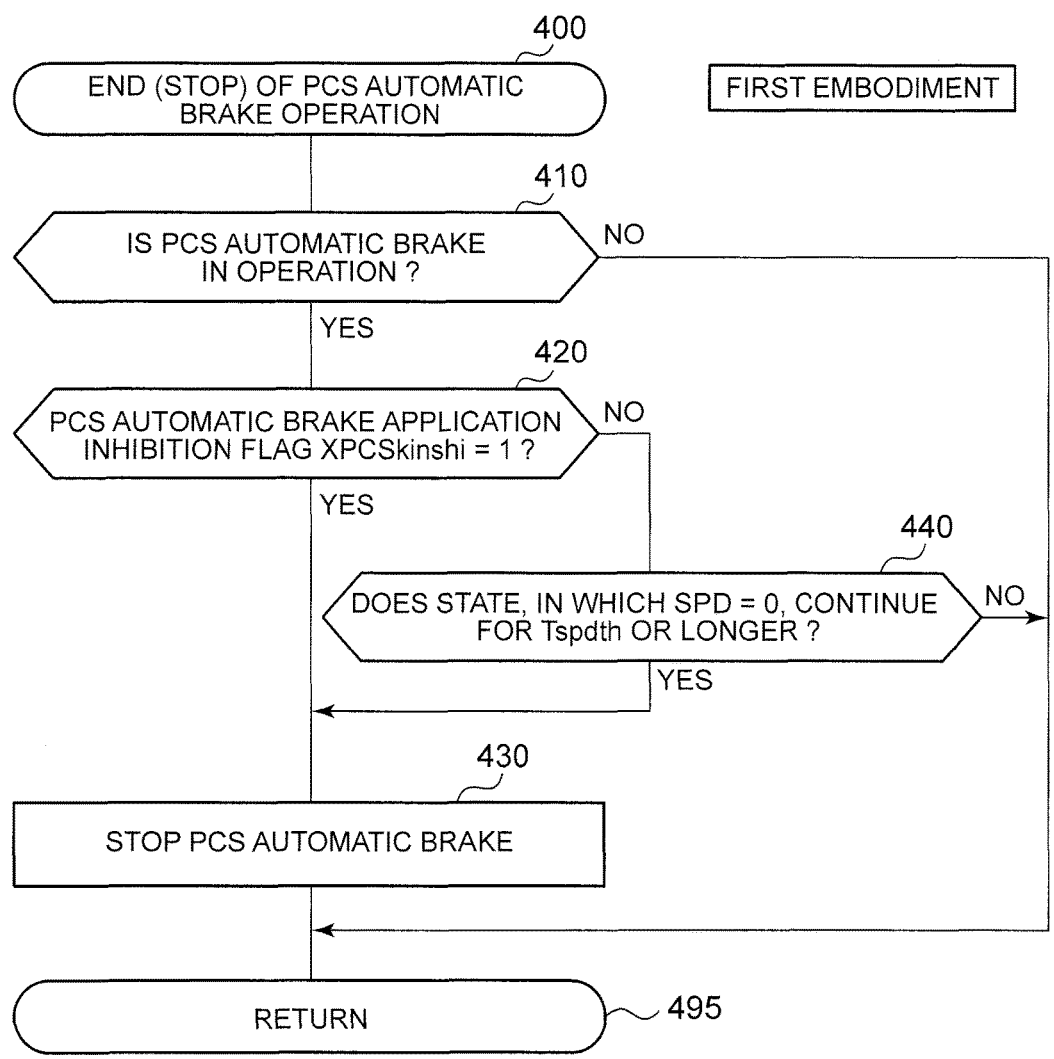
FIG. 4 is a flowchart showing a routine executed by the CPU of the driving assistance ECU shown in FIG. 2.

Therefore, at a predetermined time, the CPU starts the processing in step 400 in FIG. 4 and proceeds to step 410 to determine whether the PCS automatic brake is in operation. If the PCS automatic brake is not in operation, the CPU determines that the result of step 410 is "No" and proceeds directly to step 495 to once terminate this routine.

On the other hand, if the PCS automatic brake is in operation, the CPU determines that the result of step 410 is "Yes" and proceeds to step 420 to determine whether the value of the inhibition flag XPCSkinshi is "1".

If the inhibition flag XPCSkinshi is "1", the CPU determines that the result of step 420 is "Yes" and proceeds to step 430 to end (stop) the PCS automatic brake. That is, the CPU sets the magnitude of the requested deceleration Gpcs, which is based on the PCS automatic brake, to "0". After that, the CPU proceeds to step 495 to once terminate this routine. As a result, the PCS automatic brake is stopped (ended).

On the other hand, if the value of the inhibition flag XPCSkinshi is not "1" when the CPU performs the processing in step 420, the CPU determines that the result of step 420 is "No" and proceeds to step 440 to determine whether the state, in which the PCS automatic brake is in operation and the vehicle speed SPD is "0" (that is, vehicle stopped state), continues for the length of time equal to or longer than the threshold time Tspdth. If the state, in which the automatic brake is in operation and the vehicle speed SPD is "0", continues for the length of time equal to or longer than the threshold time Tspdth, the CPU determines that the result of step 440 is "Yes" and proceeds to step 430. As a result, the PCS automatic brake is stopped (ended). In this case, the CPU may reset the value of the inhibition flag XPCSkinshi to "0".

On the other hand, if "the state in which the automatic brake is in operation and the vehicle speed SPD is "0"" does not continue for the length of time equal to or longer than the threshold time Tspdth, the CPU determines that the result of step 440 is "No" and proceeds directly to step 495 to once terminate this routine. As a result, the PCS automatic brake is continued.

Next, the processing performed when the PCS automatic brake in operation is described. The CPU executes the routine (PCS automatic brake in-operation processing routine), shown by the flowchart in FIG. 5, each time a predetermined time elapses.

Figure 5:
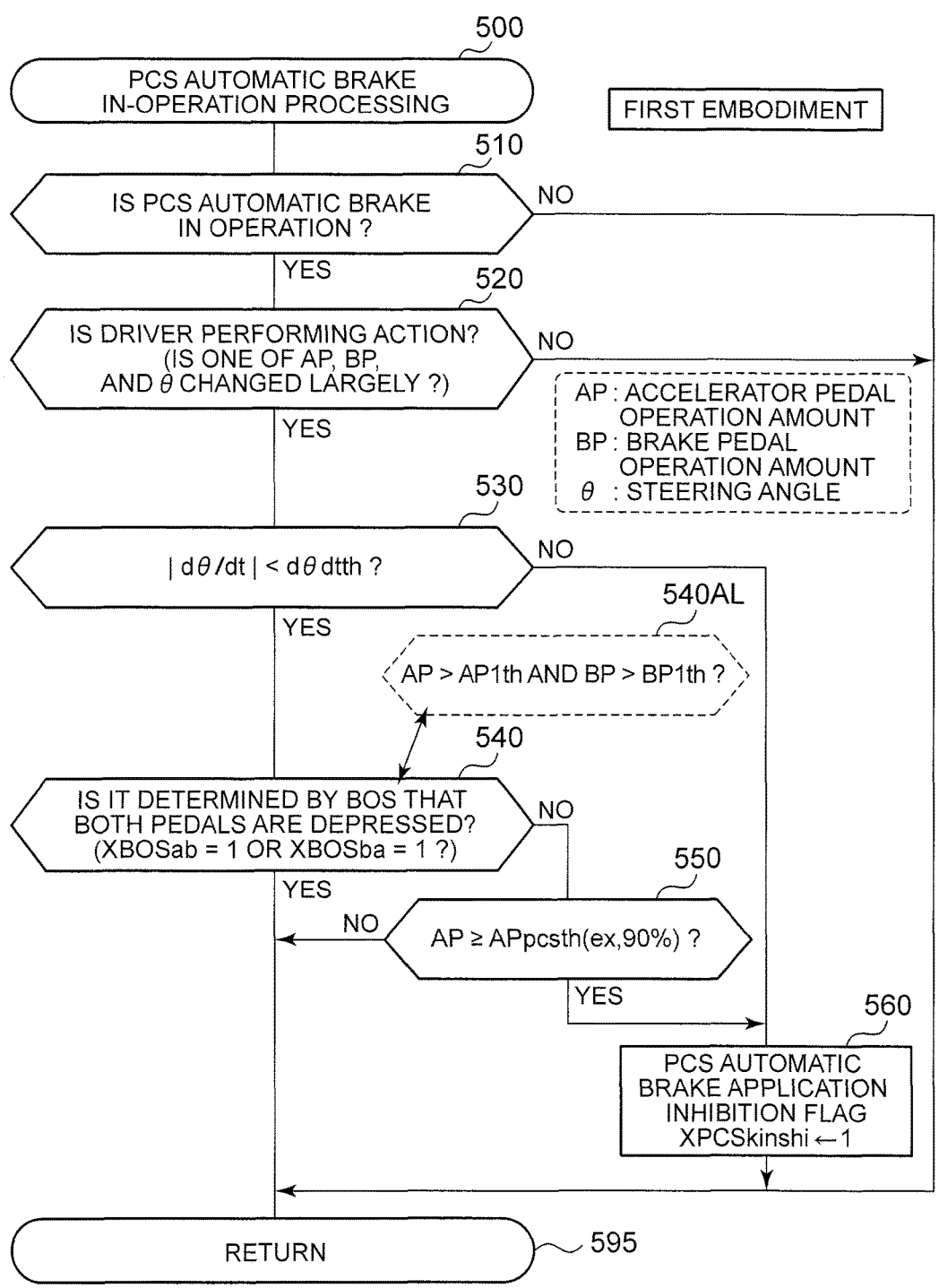
FIG. 5 is a flowchart showing a routine executed by the CPU of the driving assistance ECU shown in FIG. 2.

Therefore, at a predetermined time, the CPU starts the processing in step 500 in FIG. 5 and proceeds to step 510 to determine whether the PCS automatic brake is in operation. If the PCS automatic brake is not in operation, the CPU determines that the result of step 510 is "No" and proceeds directly to step 595 to once terminate this routine.

On the other hand, if the PCS automatic brake is in operation, the CPU determines that the result of step 510 is "Yes" and proceeds to step 520 to determine whether the driver is performing a driving operation (action). More specifically, the CPU determines that the driver is performing a driving operation if one of the following three conditions is satisfied: the condition that the absolute value of the amount of change in the accelerator pedal operation amount AP per unit time ($|dAP/dt|$) is equal to or larger than the threshold dAPactth that is positive, the condition that the absolute value of the amount of change in the brake pedal operation amount BP per unit time ($|dBP/dt|$) is equal to or larger than the threshold dBPactth that is positive, and the condition that the absolute value of the amount of change in the steering angle θ per unit time ($|dθ/dt|$) is equal to or larger than the threshold dθactth that is positive.

If the driver is not performing a driving operation, the CPU determines that the result of step 520 is "No" and proceeds directly to step 595 to once terminate this routine. As a result, the PCS automatic brake operation is continued.

If the driver is performing a driving operation, the CPU determines that the result of step 520 is "Yes" and proceeds to step 530 to determine whether the absolute value of the amount of change in the steering angle θ per unit time ($|dθ/dt|$) is smaller than the collision avoidance threshold dθdtth that is positive. That is, in step 530, the CPU determines whether the driver performs the collision avoidance operation via the steering operation.

If the absolute value of the amount of change in the steering angle θ per unit time ($|dθ/dt|$) is smaller than the threshold dθdtth, the CPU determines that the result of step 530 is "Yes" and proceeds to step 540 to determine whether the BOS has determined that "both the accelerator pedal 201 and the brake pedal 202 are depressed". More specifically, in step 540, the CPU determines whether at least one of the both-pedal depression determination flag XBOSab and the both-pedal depression determination flag XBOSba is set to "1". The detail of this determination (both-pedal depression determination) performed by the BOS will be described later.

If the BOS has determined that both the accelerator pedal 201 and the brake pedal 202 are depressed, the CPU determines that the result of step 540 is "Yes" and proceeds directly to step 595 to once terminate this routine. As a result, the operation of the PCS automatic brake is continued.

On the other hand, if it is not determined that both the accelerator pedal 201 and the brake pedal 202 are depressed when the CPU performs the processing in step 540 (that is, if both the flag XBOSab and the flag XBOSba are "0"), the CPU determines that the result of step 540 is "No" and proceeds to step 550. In step 550, the CPU determines whether the accelerator pedal operation amount AP is equal to or larger than the PCS automatic brake stop threshold APpcsth. As described above, this threshold APpcsth is a value corresponding to 90% when the maximum value of the accelerator pedal operation amount AP is 100%. This threshold APpcsth may be a value larger than "0".

If it is not determined that both the accelerator pedal 201 and the brake pedal 202 are depressed and if the accelerator pedal operation amount AP is equal to or larger than the PCS automatic brake stop threshold APpcsth, it can be estimated that the driver has an intention to avoid collision via the accelerator pedal operation (in other words, the driver has an intention to release the PCS automatic brake). Therefore, in this case, the CPU determines that the result of step 550 is "Yes" and proceeds to step 560 to set the value of the inhibition flag XPCSkinshi to "1". After that, the CPU proceeds to step 595. As a result, the CPU determines that the result of step 420 is "Yes" when the CPU proceeds to step 420 in FIG. 4 and then proceeds to step 430. Therefore, the PCS automatic brake is stopped.

On the other hand, if the accelerator pedal operation amount AP is smaller than the PCS automatic brake stop threshold APpcsth when the CPU performs the processing in step 550, the CPU determines that the result of step 550 is "No" and proceeds directly to step 595 to once terminate this routine. As a result, the operation of the PCS automatic brake is continued.

In addition, if the absolute value of the amount of change in the steering angle θ per unit time (|dθ/dt|) is equal to or larger than the threshold dθdtth when the CPU performs the processing in step 530, the CPU determines that the result of step 530 is "No" and proceeds to step 560. Therefore, in this case, too, the operation of the PCS automatic brake is stopped.

Next, the resetting of the PCS automatic brake application inhibition flag XPCSkinshi is described. The CPU executes the routine (PCS automatic brake application inhibition flag resetting routine), shown by the flowchart in FIG. 6, each time a predetermined time elapses.

Figure 6:
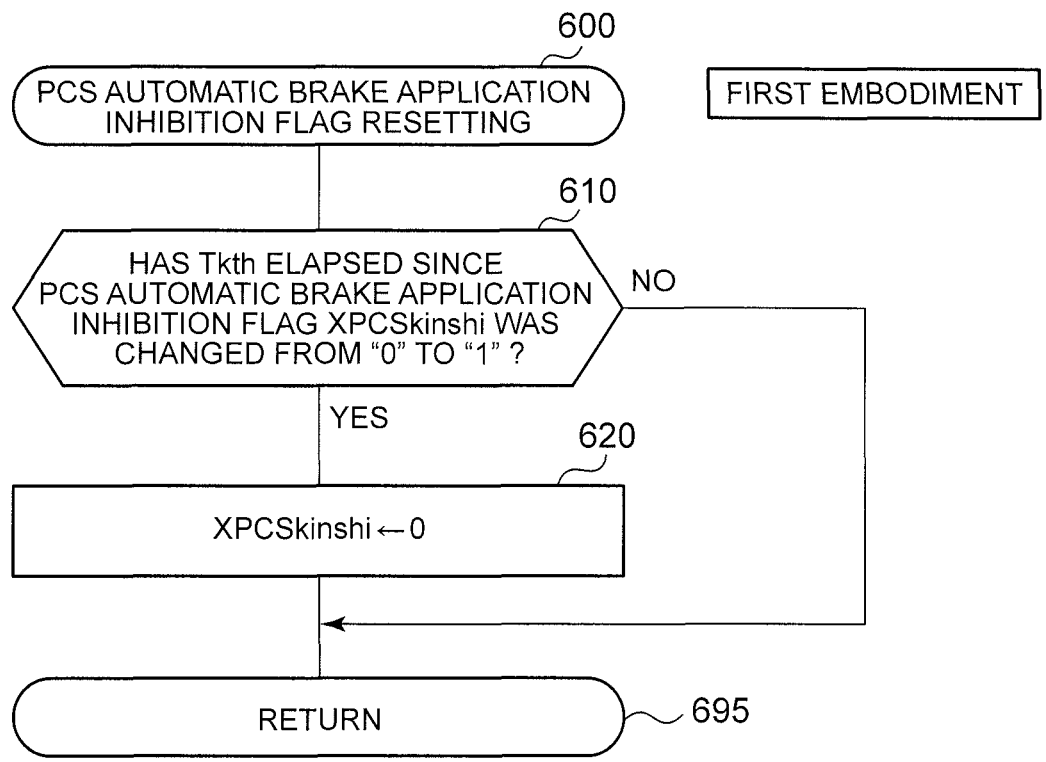
FIG. 6 is a flowchart showing a routine executed by the CPU of the driving assistance ECU shown in FIG. 2.

Therefore, at a predetermined time, the CPU starts the processing in step 600 in FIG. 6 and proceeds to step 610 to determine whether the threshold time Tkth (for example, 20 seconds) has elapsed since the value of the inhibition flag XPCSkinshi was changed from "0" to "1". If the threshold time Tkth has elapsed since the value of the inhibition flag XPCSkinshi was changed from "0" to "1", the CPU determines that the result of step 610 is "Yes" and proceeds to step 620 to set the value of the inhibition flag XPCSkinshi to "0" (reset the flag). After that, the CPU proceeds to step 695 to once terminate this routine.

On the other hand, if the threshold time Tkth has not yet elapsed since the value of the inhibition flag XPCSkinshi was changed from "0" to "1", the CPU determines that the result of step 610 is "No" and proceeds directly to step 695 to once terminate this routine.

Figure 7:
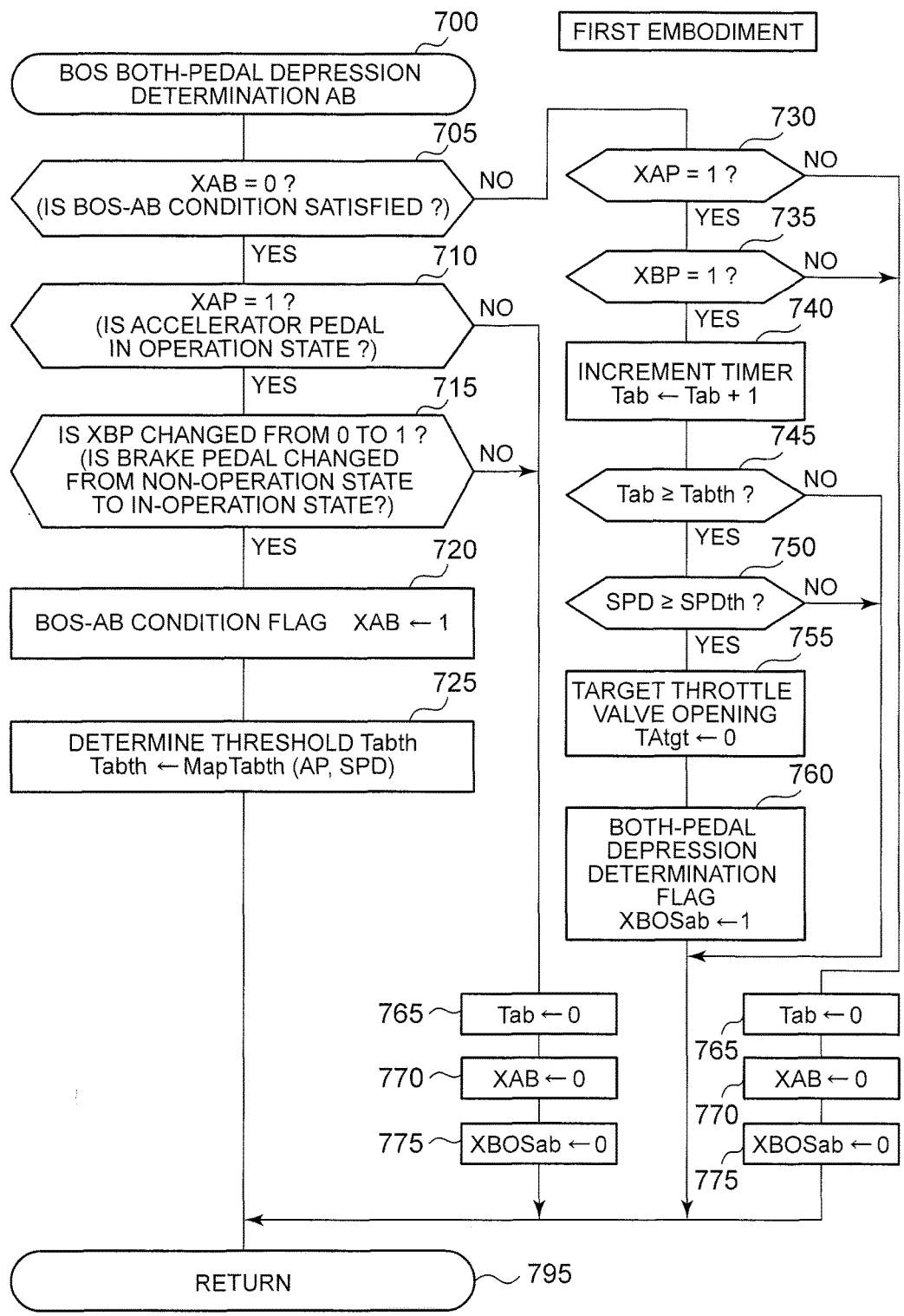
FIG. 7 is a flowchart showing a routine executed by the CPU of the driving assistance ECU shown in FIG. 2.
Figure 8:
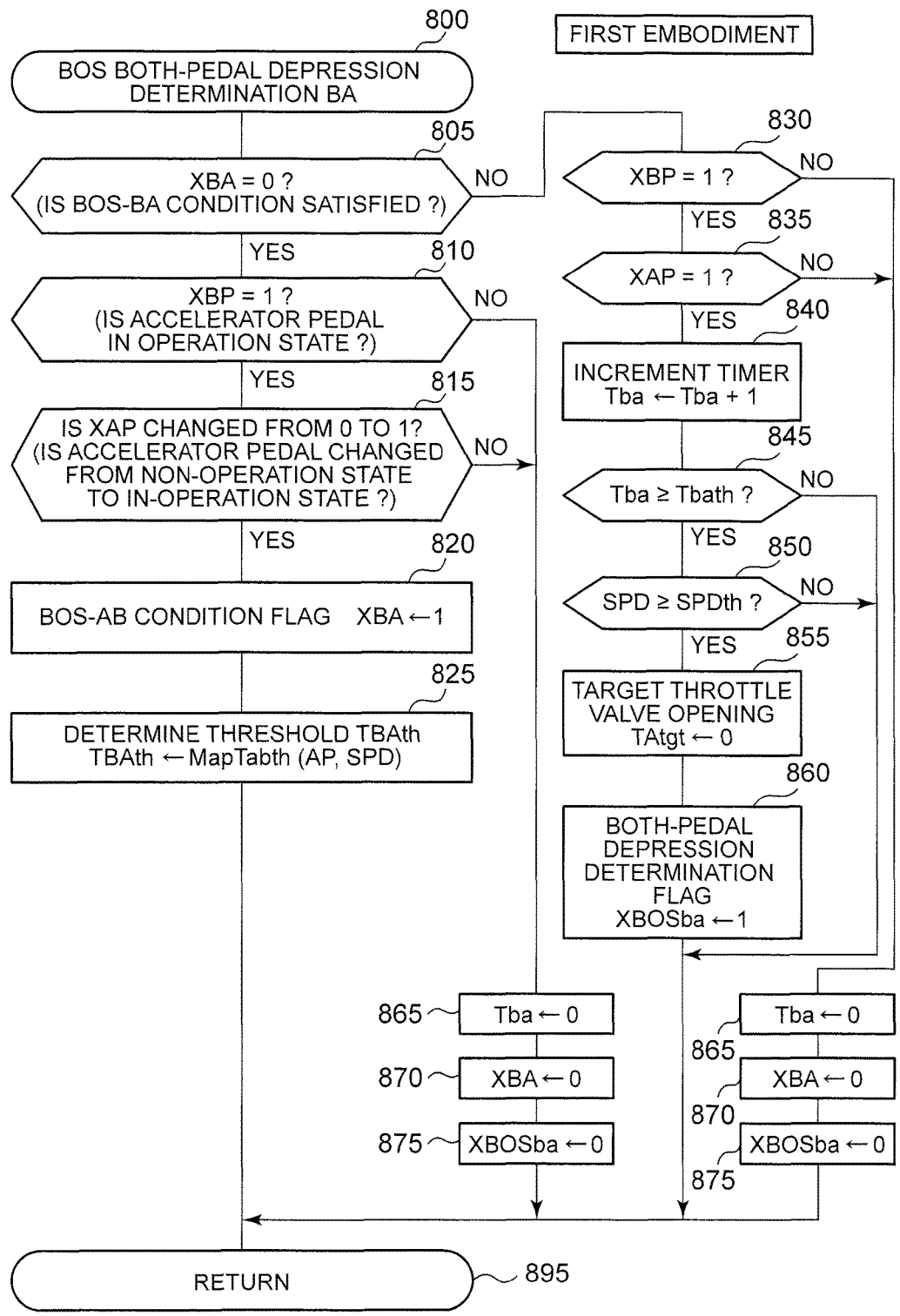
FIG. 8 is a flowchart showing a routine executed by the CPU of the driving assistance ECU shown in FIG. 2.

Next, the both-pedal depression determination performed by the BOS is described. In practice, the CPU executes the routines, shown by the flowcharts in FIG. 7 and FIG. 8, to allow the BOS to perform the both-pedal depression determination. The routine in FIG. 7 shows the both-pedal depression determination processing performed when the brake pedal 202 is depressed with the accelerator pedal 201 already depressed. The routine in FIG. 8 shows the both-pedal depression determination processing performed when the accelerator pedal 201 is depressed with the brake pedal 202 already depressed.

The CPU executes both-pedal depression determination routine 1, shown by the flowchart in FIG. 7, each time a predetermined time elapses.

Therefore, at a predetermined time, the CPU starts the processing in step 700 in FIG. 7 and proceeds to step 705 to determine whether the value of the accelerator-brake condition flag (BOS-AB condition flag) XAB is "0". The flag XAB is set to "0" by the initial routine described above.

If the flag XAB is "0", the CPU determines that the result of step 705 is "Yes" and proceeds to step 710 to determine whether the value of the accelerator operation flag XAP is "1". The flag XAP is set by a routine, not shown, to "1" if the accelerator pedal operation amount AP is larger than the predetermined value (first predetermined amount) APa, and to "0" if the accelerator pedal operation amount AP is equal to or smaller than the predetermined value APa. The first predetermined amount APa, a value equal to or larger than "0", is a value corresponding to 17% when the maximum value of the accelerator pedal operation amount is 100%.

It is now assumed that the accelerator pedal 201 is depressed with the accelerator pedal operation amount AP being equal to or larger than the first predetermined amount APa. Then, the value of the flag XAP is set to "1". Therefore, the CPU determines that the result of step 710 is "Yes" and proceeds to step 715 to determine whether the state is changed from the state in which the brake pedal 202 is not depressed (not in operation) to the state in which the brake pedal 202 is depressed (in operation). More specifically, the CPU determines whether the current time is the moment immediately after the value of the flag XBP is changed from "0" to "1". The flag XBP is set by a routine, not shown, to "0" if the brake pedal operation amount BP is equal to or smaller than the "second predetermined amount BPa ("0" in this example)", and to "1" if the brake pedal operation amount BP is larger than the "second predetermined amount ("0" in this example)". Therefore, XBP may be set to "0" if the stop lamp switch state is the off state, and to "1" if the stop lamp switch state is the on state.

It is now assumed that the current time is the moment immediately after the value of the flag XBP is changed from "0" to "1". Then, the CPU determines that the result of step 715 is "Yes", sequentially performs the processing in step 720 and step 725 described below, and proceeds to step 795 to once terminate this routine.

Step 720: The CPU sets the value of the BOS-AB condition flag XAB to "1". As understood from the above description, the value of the BOS-AB condition flag XAB is set to "1" if the brake pedal 202 is depressed with the accelerator pedal 201 depressed.

Figure 9A:
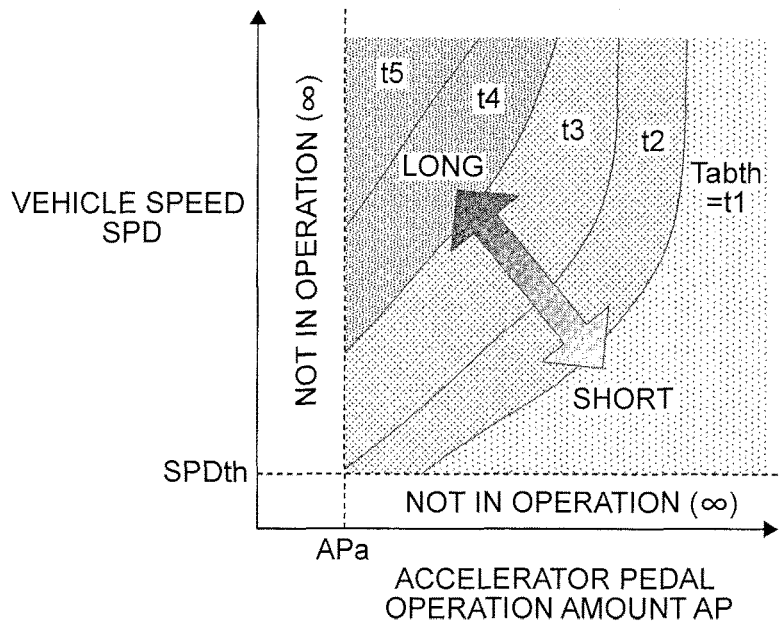
FIG. 9A is a diagram showing a lookup table referenced by the CPU of the driving assistance ECU shown in FIG. 2.

Step 725: The CPU applies the accelerator pedal operation amount AP and the vehicle speed SPD to the lookup table MapTabth(AP, SPD), shown in FIG. 9A, to determine the both-pedal depression determination threshold time Tabth. According to this table MapTabth(AP, SPD), the threshold time Tabth is determined shorter as the accelerator pedal operation amount AP is larger and is determined shorter as the vehicle speed SPD is lower.

If the CPU proceeds again to step 705 with the value of the BOS-AB condition flag XAB set to "1", the CPU determines that the result of step 705 is "No" and proceeds to step 730. In step 730, the CPU determines whether the value of the accelerator operation flag XAP is "1".

If the value of the accelerator operation flag XAP is still "1", the CPU determines that the result of step 730 is "Yes" and proceeds to step 735 to determine whether the value of the flag XBP is "1". If the value of the flag XBP is still "1", the CPU determines that the result of step 735 is "Yes" and proceeds to step 740 to increment the value of the timer Tab by "1". This timer Tab is a timer for measuring the duration time during which the value of the BOS-AB condition flag XAB is "1".

Next, the CPU proceeds to step 745 to determine whether the value of the timer Tab is equal to or larger than the threshold time Tabth. If the value of the timer Tab is smaller than the threshold time Tabth, the CPU determines that the result of step 745 is "No" and proceeds directly to step 795 to once terminate this routine.

On the other hand, if the value of the timer Tab is equal to or larger than the threshold time Tabth, the CPU determines that the result of step 745 is "Yes" and proceeds to step 750 to determine whether the vehicle speed SPD is equal to or higher than the threshold vehicle speed SPDth (for example, 7 km/h). If the vehicle speed SPD is equal to or higher than the threshold vehicle speed SPDth, the CPU determines that the result of step 750 is "Yes" and proceeds to step 755 to set the target throttle valve opening TAtgt to "0". This target throttle valve opening TAtgt is sent to the engine ECU 30. The engine ECU 30 drives the throttle valve actuator so that the throttle valve opening matches the target throttle valve opening TAtgt. Therefore, as a result of the processing in step 755, the throttle valve opening becomes "0" (that is, the throttle valve is completely closed) with the internal combustion engine torque (therefore, the driving force of the vehicle VA) reduced.

Next, the CPU proceeds to step 760 to set the value of the both-pedal depression determination flag XBOSab to "1" and proceeds to step 795 to once terminate this routine. As described above, if the accelerator pedal operation amount AP is equal to or larger than the first predetermined amount APa and, at the same time, the brake pedal operation amount BP becomes larger than "0" (second predetermined amount BPa) and if that state (that is, both the accelerator pedal 201 and the brake pedal 202 are each depressed to the amount corresponding to the depression amount equal to or larger than the respective threshold amount (first predetermined amount APa, second predetermined amount BPa)) continues for the length of time equal to or longer than the threshold time Tabth, the specified condition is satisfied. If the specified condition is satisfied, the CPU (BOS) determines that the both-pedal depression state is generated and sets the value of the both-pedal depression determination flag XBOSab to "1".

If it is determined that the result of one of step 710, step 715, step 730, and step 735 is "No", the CPU performs the processing of step 765 to step 775 described below and then proceeds to step 795.

Step 765: The CPU sets (clears) the value of the timer Tab to "0". Step 770: The CPU sets (clears) the value of the BOS-AB condition flag XAB to "0". Step 775: The CPU sets (clears) the value of the both-pedal depression determination flag XBOSab to "0".

The CPU executes both-pedal depression determination routine 2, shown by the flowchart in FIG. 8, each time a predetermined time elapses.

Therefore, at a predetermined time, the CPU starts the processing in step 800 in FIG. 8 and proceeds to step 805 to determine whether the value of the brake-accelerator condition flag (BOS-BA condition flag) XBA is "0". The flag XBA is set to "0" by the initial routine described above.

If the flag XBA is "0", the CPU determines that the result of step 805 is "Yes" and proceeds to step 810 to determine whether the value of the brake operation flag XBP is "1".

It is now assumed that the brake pedal 202 is depressed with the brake pedal operation amount BP not being "0". Then, the value of the flag XBP is set to "1". Therefore, the CPU determines that the result of step 810 is "Yes" and proceeds to step 815 to determine whether the state is changed from the state in which the accelerator pedal 201 is not depressed or depressed with the depression amount being smaller than the first predetermined amount APa (not in operation) to the state in which the accelerator pedal 201 is depressed with the depression amount being equal to or larger than the first predetermined amount APa (in operation). More specifically, the CPU determines whether the current time is the moment immediately after the value of the flag XAP is changed from "0" to "1".

It is now assumed that the current time is the moment immediately after the value of the flag XAP is changed from "0" to "1". Then, the CPU determines that the result of step 815 is "Yes", sequentially performs the processing in step 820 and step 825 described below, and proceeds to step 895 to once terminate this routine.

Step 820: The CPU sets the value of the BOS-BA condition flag XBA to "1". As understood from the above description, the value of the BOS-BA condition flag XBA is set to "1" if the accelerator pedal 201 is strongly depressed to an amount equal to or larger than the first predetermined amount APa with the brake pedal 202 depressed.

Figure 9B:
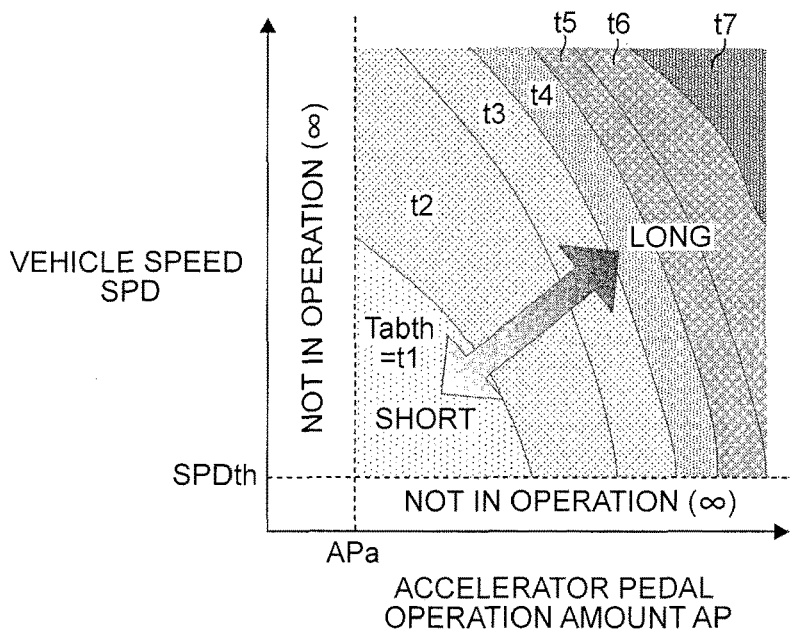
FIG. 9B is a diagram showing a lookup table referenced by the CPU of the driving assistance ECU shown in FIG. 2.

Step 825: The CPU applies the accelerator pedal operation amount AP and the vehicle speed SPD to the lookup table MapTbath(AP, SPD), shown in FIG. 9B, to determine the both-pedal depression determination threshold time Tbath. According to this table MapTbath(AP, SPD), the threshold time Tbath is determined longer as the accelerator pedal operation amount AP is larger and is determined shorter as the vehicle speed SPD is lower.

If the CPU proceeds again to step 805 with the value of the BOS-BA condition flag XBA set to "1", the CPU determines that the result of step 805 is "No" and proceeds to step 830. In step 830, the CPU determines whether the value of the flag XBP is "1".

If the value of the flag XBP is still "1", the CPU determines that the result of step 830 is "Yes" and proceeds to step 835 to determine whether the value of the accelerator operation flag XAP is "1". If the value of the accelerator operation flag XAP is still "1", the CPU determines that the result of step 835 is "Yes" and proceeds to step 840 to increment the value of the timer Tba by "1". This timer Tba is a timer for measuring the duration time during which the value of the BOS-BA condition flag XBA is "1".

Next, the CPU proceeds to step 845 to determine whether the value of the timer Tba is equal to or larger than the threshold time Tbath. If the value of the timer Tba is smaller than the threshold time Tbath, the CPU determines that the result of step 845 is "No" and proceeds directly to step 895 to once terminate this routine.

On the other hand, if the value of the timer Tba is equal to or larger than the threshold time Tbath, the CPU determines that the result of step 845 is "Yes" and proceeds to step 850 to determine whether the vehicle speed SPD is equal to or higher than the threshold vehicle speed SPDth (for example, 7 km/h). If the vehicle speed SPD is equal to or higher than the threshold vehicle speed SPDth, the CPU determines that the result of step 850 is "Yes" and proceeds to step 855 to set the target throttle valve opening TAtgt to "0". As a result, the throttle valve opening becomes "0" (that is, the throttle valve is completely closed) with the internal combustion engine torque reduced. Therefore, the driving force of the vehicle VA is reduced.

Next, the CPU proceeds to step 860 to set the value of the both-pedal depression determination flag XBOSba to "1" and proceeds to step 895 to once terminate this routine. As described above, if the brake pedal operation amount BP is equal to or larger than the predetermined amount BPa and, at the same time, the state is changed from the state, in which the accelerator pedal operation amount AP is smaller than the first predetermined amount APa and therefore the accelerator pedal is not depressed (not in operation), to the state in which the accelerator pedal operation amount AP is equal to or larger than the first predetermined amount APa and therefore the accelerator pedal is depressed (in operation) and if that state (that is, both the accelerator pedal 201 and the brake pedal 202 are each depressed to the amount corresponding to the depression amount equal to or larger than the respective threshold amount (first predetermined amount APa, second predetermined amount BPa)) continues for the length of time equal to or longer than the threshold time Tbath, the specified condition is satisfied. If the specified condition is satisfied, the CPU (BOS) determines that the both-pedal depression state is generated and sets the value of the both-pedal depression determination flag XBOSba to "1".

If it is determined that the result of one of step 810, step 815, step 830, and step 835 is "No", the CPU performs the processing of step 865 to step 875 described below and then proceeds to step 895.

Step 865: The CPU sets (clears) the value of the timer Tba to "0". Step 870: The CPU sets (clears) the value of the BOS-BA condition flag XBA to "0". Step 875: The CPU sets (clears) the value of the both-pedal depression determination flag XBOSba to "0".

As described above, if "the state in which both the accelerator pedal 201 working as an accelerator operation unit and the brake pedal 202 working as a brake operation unit are in operation at the same time" is detected while the PCS automatic brake is applied, the first device does not stop, but continues, the PCS automatic brake even if the accelerator pedal operation amount AP becomes equal to or larger than the automatic brake stop threshold (APpcsth).

Therefore, if "the state in which both the accelerator pedal 201 and the brake pedal 202 are in operation at the same time" is generated, the braking force for avoiding collision with an object can be continuously applied to the vehicle VA.

On the other hand, if the brake pedal 202 is not depressed but the accelerator pedal 201 is strongly depressed (AP>APpcsth), it can be determined that the driver has "an intention to release the automatic brake". Therefore, in that case, the first device releases the automatic brake. This leads to more appropriate brake control when there is a possibility of collision.

Figure 3:
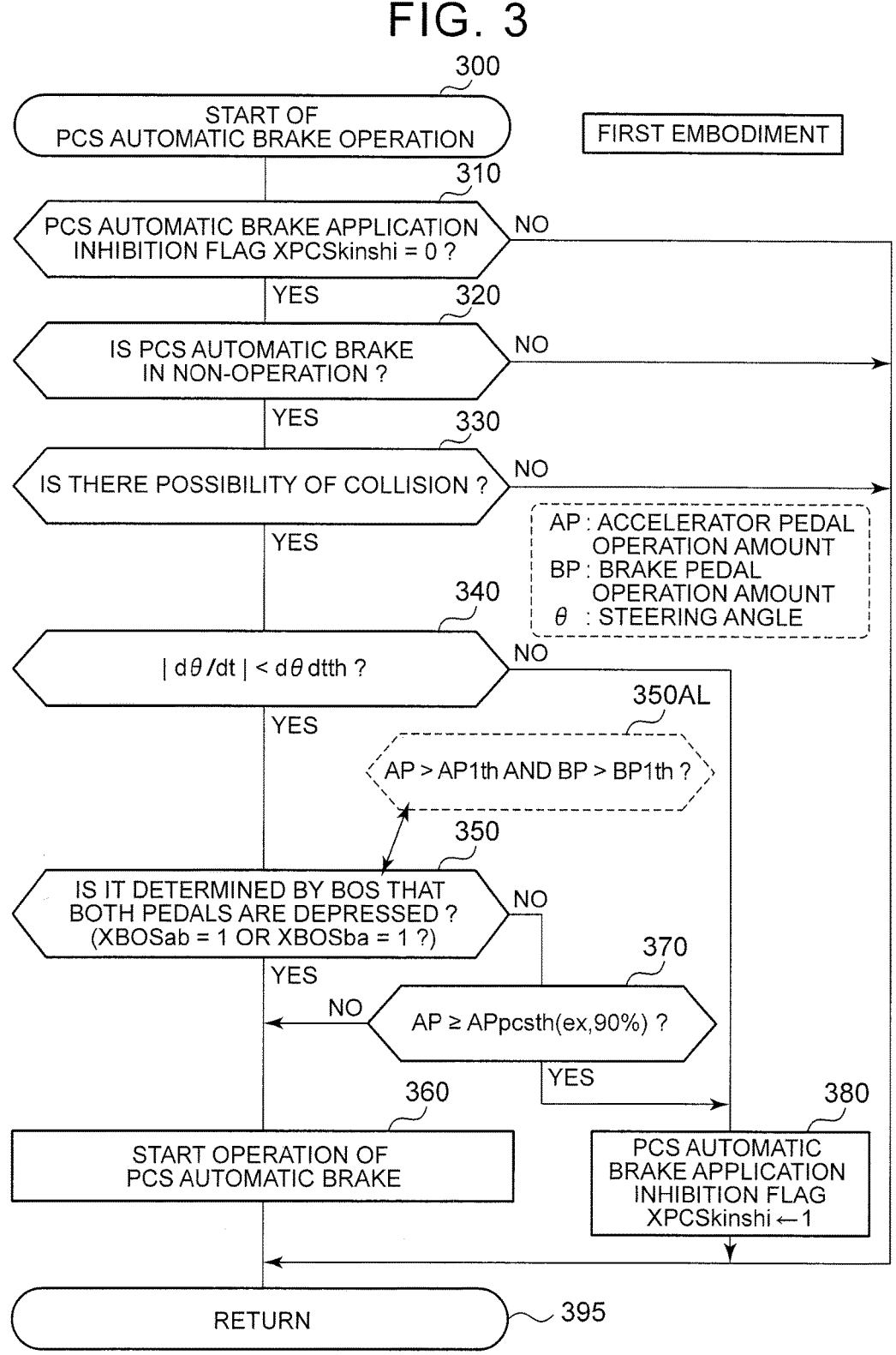
FIG. 3 is a flowchart showing a routine executed by the CPU of the driving assistance ECU shown in FIG. 2.

The CPU may perform the processing of step 350AL shown in FIG. 3 instead of step 350 in FIG. 3. In this case, the execution of the routines shown in FIG. 7 and FIG. 8 is omitted. More specifically, when step 350 is reached, the CPU may determine whether the accelerator pedal operation amount AP is larger than the first accelerator pedal operation amount threshold (first predetermined amount) AP1th and whether the brake pedal operation amount BP is larger than the first brake pedal operation amount threshold (second predetermined amount) BP1th. The CPU may proceed to step 360 if this condition (AP>AP1th and BP>BP1th) is satisfied, and to step 370 if this condition is not satisfied. The first accelerator pedal operation amount threshold AP1th is set to the first predetermined amount equal to or larger than "0", and the first brake pedal operation amount threshold BP1th is also set to the second predetermined amount equal to or larger than "0".

If the CPU performs the processing in step 350AL and if the first predetermined amount AP1th is equal to or smaller than the PCS automatic brake stop threshold APpcsth in step 370, the determination on the accelerator pedal operation amount may be omitted in step 350AL. That is, in step 350AL, the CPU determines only whether BP>BP1th. This is because AP and APpcsth, if not compared in step 350AL, are compared in step 370, meaning that the same result is given as to which step, either step 360 or step 380, the CPU will proceed.

Similarly, the CPU may perform the processing of step 540AL shown in FIG. 5 instead of step 540 in FIG. 5. In this case, too, the execution of the routines shown in FIG. 7 and FIG. 8 is omitted. More specifically, when step 540 is reached, the CPU may determine whether the accelerator pedal operation amount AP is larger than the first accelerator pedal operation amount threshold AP1th and whether the brake pedal operation amount BP is larger than the first brake pedal operation amount threshold BP1th. The CPU may proceed to step 595 if this condition (AP>AP1th and BP>BP1th) is satisfied, and to step 550 if this condition is not satisfied.

Second Embodiment

Next, a brake control device in a second embodiment is described (hereinafter, sometimes called a "second device"). The second device differs from the first device in that, when "the state in which both the accelerator pedal 201 and the brake pedal 202 are depressed at the same time (both-pedal depression state)" is determined while the PCS automatic brake is in operation, the operation of the PCS automatic brake is stopped and the pre-crash brake assist control is performed (or continued). The pre-crash brake assist control, also denoted as "PBA", is sometimes simply called "brake assist control". The brake assist control itself is a known technology and is described in Japanese Patent Application Publication No. 2008-305421 (JP 2008-305421 A), Japanese Patent No. 4701985, and Japanese Patent No. 3927256.

The specific operation of the second device is described. The CPU, included in a driving assistance ECU 20 of the second device, executes the routines, shown by the flowcharts in FIG. 3, FIG. 4, "FIG. 10 in place of FIG. 5", FIG. 6 to FIG. 8, and FIG. 11, each time a predetermined time elapses. Therefore, the "PCS automatic brake in-operation processing routine" shown in FIG. 10 and the "brake assist control routine" shown in FIG. 11 are described below. In FIG. 10, for "a step that performs the same processing as that of a step in FIG. 5", the reference numeral used for the step in FIG. 5 is used and the repetitive description will not be given if not necessary.

First, the processing performed while the PCS automatic brake is in operation is described. When step 540 in FIG. 10 is reached while the PCS automatic brake is in operation, the CPU determines whether the BOS has determined that "both the accelerator pedal 201 and the brake pedal 202 are depressed at the same time". The CPU may perform the processing of step 540AL, shown in FIG. 10, instead of the processing in step 540.

If the BOS has determined that both the accelerator pedal 201 and the brake pedal 202 are depressed at the same time, the CPU determines that the result of step 540 is "Yes", sequentially performs step 1010 and step 1020 described below and, after that, proceeds to step 1095 to once terminate this routine.

Step 1010: The CPU sets the inhibition flag XPCSkinshi to "1". As a result, the CPU determines that the result of step 420 is "Yes" when the CPU proceeds to step 420 and then proceeds to step 430. Therefore, the operation of PCS automatic brake is stopped.

Step 1020: The CPU sets the value of the brake assist request flag (PBA request flag) XPBAreq to "1". The value of the flag XPBAreq is also set to "0" by the initial routine described above. As a result, through the processing in step 1110 to step 1130 in FIG. 11 that will be described later, the brake assist control is started regardless of the pedal force Fp of the brake pedal 202. As will be described later, if the brake assist control is already performed when the value of the flag XPBAreq is set to "1", the brake assist control is simply continued.

On the other hand, if the CPU determines that the result of step 540 is "No", the CPU proceeds to step 550. If the CPU determines that the result of step 550 is "Yes", the CPU proceeds to step 560 to set the value of the inhibition flag XPCSkinshi to "1". As a result, the operation of the PCS automatic brake is stopped. On the other hand, if the CPU determines that the result of step 550 is "No", the CPU proceeds directly to step 1095 to once terminate this routine. As a result, the operation of the PCS automatic brake is continued.

As described above, if both the accelerator pedal 201 and the brake pedal 202 are depressed at the same time while the PCS automatic brake is in operation, the second device stops the PCS automatic brake and performs the brake assist control.

Next, PBA (pre-crash brake assist control) is described. At a predetermined time, the CPU starts the processing in step 1100 in FIG. 11 and proceeds to step 1110 to determine whether the brake assist (PBA) is not performed.

It is now assumed that the brake assist is in non-operation. In this case, the CPU determines that the result of step 1110 is "Yes" and proceeds to step 1120 to determine whether the value of the brake assist request flag XPBAreq is "1". If the value of the brake assist request flag XPBAreq is "1", the CPU determines that the result of step 1120 is "Yes" and proceeds to step 1130 to start the operation of the brake assist. More specifically, the CPU sets the value of the requested deceleration Gbpd for the brake pedal operation amount BP to a value larger than that for use when the brake assist is not in operation. That is, the CPU increases the requested deceleration Gbpd for the brake pedal operation amount BP. After that, the CPU proceeds to step 1170. As a result, because a large requested deceleration Gbpd is sent to the brake ECU 40 even when the brake pedal operation amount BP is small, "the requested deceleration Gbpd" is selected as the final target deceleration with the result that the vehicle VA is decelerated by a large deceleration.

If the CPU determines that the result of step 1120 is "Yes" and proceeds to step 1130 (that is, if the PCS automatic brake is released and the brake assist control is started), it is desirable that the CPU set the brake operation requested deceleration Gbpd, which will be used in the brake assist control, so that the brake assist control generates the deceleration equivalent to the requested deceleration Gpcs that has been output by the PCS automatic brake.

On the other hand, if the value of the brake assist request flag XPBAreq is "0" when the CPU performs the processing in step 1120, the CPU determines that the result of step 1120 is "No" and proceeds to step 1140 to determine whether the time to collision TTC, calculated in step 330 in FIG. 3, is equal to or smaller than the threshold time TTCpbath for the brake assist (PBA control). The threshold time TTCpbath for the brake assist is set to a time longer than the threshold time TTCth for the PCS automatic brake.

If the time to collision TTC is equal to or shorter than the threshold time TTCpbath, the CPU determines that the result of step 1140 is "Yes" and proceeds to step 1150 to determine whether the pedal force Fp of the brake pedal 202 is larger than the PBA start threshold pedal force Fpth.

If the pedal force Fp is larger than the PBA start threshold pedal force Fpth, the CPU determines that the result of step 1150 is "Yes" and proceeds to step 1160 to determine whether the amount of change in the pedal force Fp per unit time (time differential value of the pedal force Fp) dFp/dt is larger than the PBA start threshold change amount dFpdtth. If dFp/dt is larger than dFpdtth, the CPU determines that the result of step 1160 is "Yes" and proceeds to step 1130. As a result, the operation of the brake assist is started.

If it is determined that any of step 1110 and step 1140 to step 1160 is "No", the CPU proceeds from the respective step directly to step 1170.

In step 1170, the CPU determines whether the brake pedal operation amount BP is "0". That is, the CPU determines whether the operation of the brake pedal 202 is released. If the brake pedal operation amount BP is not "0", the CPU determines that the result of step 1170 is "No" and proceeds directly to step 1195 to once terminate this routine. As a result, the brake assist, if performed, is continued.

On the other hand, if the brake pedal operation amount BP is "0", the CPU determines that the result of step 1170 is "Yes", sequentially performs the processing in step 1180 and step 1190 described below, and proceeds to step 1195 to once terminate this routine.

Step 1180: The CPU sets the value of the brake assist request flag XPBAreq to "0". Step 1190: The CPU ends the brake assist. As a result, the value of the requested deceleration Gbpd for the brake pedal operation amount BP is returned to the value of the normal operation time (brake assist is not performed).

As described above, when the state is detected in which both the accelerator pedal and the brake pedal are operated at the same time while the PCS automatic brake is applied, the second device stops the PCS automatic brake and, instead, starts the brake assist (or continues the brake assist if the brake assist is already applied at that time).

Therefore, if the driver has an intention to release the PCS automatic brake when both the accelerator pedal 201 and the brake pedal 202 are operated at the same time, the automatic brake is released according to the driver's intention. On the other hand, if the driver has an intention to apply the brake to the vehicle VA, the brake assist control works to allow the driver to apply a large braking force to the vehicle via a small amount of brake operation.

The disclosure is not limited to the embodiments described above but a variety of modifications may be used. For example, the first device may also execute the routine, shown in FIG. 11, to use the brake assist. In that case, however, step 1120 is omitted and, if it is determined that the result of step 1110 is "Yes" and that the results of all steps, from step 1140 to step 1160, are "Yes", the CPU proceeds to step 1130. Furthermore, the first device and the second device need not have the camera device 22. In addition, if it is determined that the result of step 350 in FIG. 3 is "Yes", the CPU of the second device may perform the processing, similar to that in step 380, to set the value of the inhibition flag XPCSkinshi to "1" for skipping step 360.

What is claimed is:

1. A brake control device of a vehicle, the brake control device comprising:
    an object detector that detects an object in front of the vehicle; and
    at least one electronic control unit configured to:
    (a) determine whether a predetermined condition is satisfied based on an output of the object detector, the predetermined condition indicating that there is a possibility that the vehicle collides with the object,
    (b) apply an automatic brake when it is determined that the predetermined condition is satisfied, the automatic brake automatically applying a braking force to the vehicle,
    (c) stop applying the automatic brake when an operation amount of an accelerator operation unit of the vehicle becomes equal to or larger than a predetermined threshold while the automatic brake is being applied, (d) determine whether a specified condition is satisfied, the specified condition including a condition that an operation amount of a brake operation unit of the vehicle is larger than a second predetermined amount, and (e) continue applying the automatic brake regardless of whether the operation amount of the accelerator operation unit becomes equal to or larger than the predetermined threshold and regardless of whether the operation amount of the accelerator operation unit is greater than the operation amount of the brake operation unit, when it is determined that the specified condition is satisfied.

2. The brake control device according to claim 1, wherein the specified condition includes a condition that the operation amount of the accelerator operation unit is larger than a first predetermined value.

3. The brake control device according to claim 2, further comprising:

a brake actuator, wherein the at least one electronic control unit applies the automatic brake by sending a signal to the brake actuator to drive the brake actuator.

4. A brake control device of a vehicle, the brake control device comprising:

an object detector that detects an object in front of the vehicle; and at least one electronic control unit configured to:

(a) determine whether a predetermined condition is satisfied based on an output of the object detector, the predetermined condition indicating that there is a possibility that the vehicle collides with the object, (b) apply an automatic brake when it is determined that the predetermined condition is satisfied, the automatic brake automatically applying a braking force to the vehicle, (c) determine whether a specified condition is satisfied, the specified condition including a condition that an operation amount of a brake operation unit of the vehicle is larger than a second predetermined amount, (d) stop applying the automatic brake when an operation amount of an accelerator operation unit becomes equal to or larger than a predetermined automatic brake stop threshold while the automatic brake is being applied and stop applying the automatic brake when it is determined that the specified condition is satisfied while the automatic brake is being applied, and (e) perform brake assist control for the vehicle when it is determined that the specified condition is satisfied while the automatic brake is being applied, the brake assist control increasing a braking force that is generated according to the operation amount of the brake operation unit as compared to a braking force that is generated when the brake assist control is not performed.

5. The brake control device according to claim 4, wherein the specified condition includes a condition that the operation amount of the accelerator operation unit is larger than a first predetermined amount.

6. The brake control device according to claim 5, further comprising:

a brake actuator, wherein the at least one electronic control unit applies the automatic brake to, and the brake assist control for, the vehicle by sending a signal to the brake actuator to drive the brake actuator.

7. The brake control device according to claim 4, wherein the at least one electronic control unit is configured to increase the braking force that is generated according to the operation amount of the brake operation unit so that a deceleration equivalent to a deceleration to be output by the automatic brake is generated.

* * * * *